United States Patent
Cohen et al.

(10) Patent No.: US 10,823,207 B2
(45) Date of Patent: Nov. 3, 2020

(54) METHOD AND CAVITY FOR SUPPRESSION OF CAVITY FLOW OSCILLATIONS AND ACOUSTIC LOADS USING CURVED REAR FACE

(71) Applicant: JSAC LLC, Burlington, MA (US)

(72) Inventors: Jacob Cohen, Haifa (IL); Sudip Das, West Bengal (IN)

(*) Notice: Subject to any disclaimer, the term of this patent is extended or adjusted under 35 U.S.C. 154(b) by 98 days.

(21) Appl. No.: 16/074,963

(22) PCT Filed: Feb. 2, 2017

(86) PCT No.: PCT/IL2017/050127
§ 371 (c)(1),
(2) Date: Aug. 2, 2018

(87) PCT Pub. No.: WO2017/134666
PCT Pub. Date: Aug. 10, 2017

(65) Prior Publication Data
US 2019/0040883 A1    Feb. 7, 2019

Related U.S. Application Data

(60) Provisional application No. 62/289,936, filed on Feb. 2, 2016.

(51) Int. Cl.
| | |
|---|---|
| *F15D 1/00* | (2006.01) |
| *G10K 11/16* | (2006.01) |
| *B64C 23/00* | (2006.01) |
| *G10K 11/172* | (2006.01) |
| *F15B 21/00* | (2006.01) |

(Continued)

(52) U.S. Cl.
CPC ............. *F15D 1/003* (2013.01); *B64C 23/00* (2013.01); *F15D 1/005* (2013.01); *G10K 11/161* (2013.01); *G10K 11/172* (2013.01); *B64C 2025/003* (2013.01); *B64D 1/06* (2013.01); *F15B 21/008* (2013.01); *Y10T 137/2087* (2015.04)

(58) Field of Classification Search
CPC .......... F15D 1/00; F15D 1/003; G10K 11/172
USPC ........................................................ 137/808
See application file for complete search history.

(56) References Cited

U.S. PATENT DOCUMENTS

| | | |
|---|---|---|
| 3,578,264 A | 5/1971 | Kuethe |
| 4,718,620 A | 1/1988 | Braden et al. |

(Continued)

FOREIGN PATENT DOCUMENTS

| | | |
|---|---|---|
| DE | 102008059536 A1 | 6/2010 |
| EP | 1714871 A2 | 10/2006 |

OTHER PUBLICATIONS

Zhang et al., "The effect of trailing edge geometry on cavity flow oscillation driven by a supersonic shear layer", The Aeronautical Journal Paper No. 2258, 1998, pp. 129-136.

(Continued)

*Primary Examiner* — Kevin L Lee
(74) *Attorney, Agent, or Firm* — Dinsmore & Shohl, LLP

(57) ABSTRACT

Pressure oscillations or acoustic loads over an open type cavity having a front face an upper edge of which constitutes a leading edge and having a rear face an upper edge of which constitutes a trailing edge are reduced by applying curvature to the rear face so as to present a convex curved surface internal to the cavity. In one embodiment, a cross-section through a longitudinal axis of the convex curved surface describes part of an ellipse.

15 Claims, 14 Drawing Sheets

(51) Int. Cl.
 *B64D 1/06* (2006.01)
 *B64C 25/00* (2006.01)

(56) References Cited

U.S. PATENT DOCUMENTS

| | | | |
|---|---|---|---|
| 5,340,054 A | 8/1994 | Smith et al. | |
| 6,050,527 A | 4/2000 | Hebert et al. | |
| 6,446,904 B1 | 9/2002 | Stanek | |
| 6,739,554 B1* | 5/2004 | Stanek | B64C 1/1415 |
| | | | 244/130 |
| 8,684,040 B2* | 4/2014 | Bernitsas et al. | F15D 1/12 |
| | | | 137/808 |
| 2015/0210323 A1* | 7/2015 | Morrison et al. | B62D 35/00 |
| | | | 296/180.4 |

OTHER PUBLICATIONS

International Search Report and Written Opinion, dated Jun. 9, 2017, pertaining to PCT/IL2017/050127, filed Feb. 2, 2017.
International Preliminary Report on Patentability, dated Apr. 19, 2018, pertaining to PCT/IL2017/050127, filed Feb. 2, 2017.

* cited by examiner

Cavity Floor

Cavity Floor

METHOD AND CAVITY FOR SUPPRESSION OF CAVITY FLOW OSCILLATIONS AND ACOUSTIC LOADS USING CURVED REAR FACE

FIELD OF THE INVENTION

The invention relates to fluid flow at the rear face of a cavity.

BACKGROUND OF THE INVENTION

Cavity flows find their application spanning an entire regime of flow starting from subsonic, transonic, supersonic to hypersonic flows, with corresponding possible applications, such as car windows or roof opening and airplane landing gears (subsonic), airplane weapon bay (transonic), scramjet isolator and cavity flame holder in scramjet combustor (supersonic) and more. Cavity flows are categorized as open or closed based on their length to depth (L/D) ratio. A problem associated with open type cavity flows with L/D ratio less than 10, is critically the strong pressure oscillation created by the geometry. These pressure oscillations produce severe fluctuating pressure loads as well as noise levels in the vicinity of the cavity geometry which could be detrimental to the structure housing the cavity and its integrity. A lot of research has been made to date to understand the pressure and noise characteristics over such cavity geometries. More recent studies are oriented towards control of such loads over cavities by implementing active and passive controlling techniques. However, the implementations of any such methods which are reported in open literatures are more complex when applied to the simple cavity geometry counterpart, which needs additional effort and power. These techniques might also lead to other associated difficulties and problems in practical realization.

FIG. 1a is a schematic representation of an open cavity showing geometric configuration and nomenclature. In the figure, $L_f$ represents the floor length which is equal to L for a rectangular cavity. Cavity geometry is a combination of a backward facing step and a forward facing step as shown in FIG. 2. The tip of the backward facing step is the leading edge (LE) of the cavity and the tip of the forward facing step is the trailing edge (TE) of the cavity. For flow over cavities, the freestream flow separates from the cavity leading edge, and a shear layer is formed, which bridges the entire cavity length and impinges on trailing edge of the cavity. After the impact at the trailing edge, a sound pulse is generated which propagates upstream through the cavity passage between the backward and the forward facing step. This pulse excites the shear layer formation at the leading edge and induces a Kelvin Helmholtz type instability, which grows during convection towards the trailing edge to form an array of vortices. After impact on the rear face, acoustic waves are regenerated which closes a feedback loop and provides self-sustained pressure oscillations. These oscillations and its associated resonance frequencies can be determined by phase relation across the feedback loop that provides constructive reinforcement of the waves. The spectrum of the pressure fluctuations inside the cavity is composed of associated narrow-band tones and broadband noise. The source of broadband is due to the free-stream and the shear layer.

FIG. 3 shows schematically a self-sustained feedback loop associated with open cavity oscillations using the following nomenclature:

A: Shear Layer is formed
B: TE impingement
C: Pressure waves generated
D: Pressure waves moves upstream
E: Pressure waves moves towards maximum receptivity of shear layer
I(E): Interaction with the separation point LE
V(A): Amplification of instability induces strong vortices.

It is seen that the instabilities referred to above amplify during convection and induce vortices, which again impact the trailing edge even stronger creating more fresh acoustic pulses and the self-sustained feedback loop is completed. This results in huge pressure oscillations leading to significant noise.

It is therefore desirable to seek a simple approach to alleviate such unwanted and inevitable loads arising due to geometry configuration.

FIG. 1b is taken from Zhang, X., Rona A. Edwards J. A. 1998 *The effect of trailing edge geometry on cavity flow oscillation driven by a supersonic shear layer*. The Aeronautical Journal Paper No. 2258, 129-136. Here a curved ramp is applied at the trailing edge of the cavity and extends from a point on the rear wall of the cavity to the upper edge. The downstream extent of the cavity is equal to the depth, D, of the cavity. Referring to the illustrations in Zhang et al. it is seen in FIG. 16 that there are significant pressure oscillations in the vicinity of the trailing edge of the cavity including a notable spike toward the start of the simulation. Moreover, with particular reference to FIGS. 5 and 16, there are shown pressure histories over the same range of t $V_\infty/D$ of 0 to 200 for h=0.4 (FIG. 5) and h=0.6 (FIG. 16) both computed for identical values of x=0.33D. It is seen that the amplitudes of the pressure oscillations are substantially the same in both cases. That is to say, there is no appreciable reduction in amplitude as the height, h, of the curved ramp increases. Moreover, the amplitudes of the pressure oscillations in both cases are markedly higher than for the wedge shown in FIG. 5b.

As will become apparent from the following description, this is in marked contrast to the present invention wherein there are no detectable pressure oscillations when an elliptic surface is employed as can be seen from FIG. 13d. Moreover, the results of the present invention for an elliptic surface show a marked improvement over the 45° wedge as was computed and also measured by the inventors.

U.S. Pat. No. 6,446,904 discloses an aircraft weapons bay high frequency acoustic suppression apparatus that includes an extendable spoiler retractably received within an aircraft weapons bay. An injector unit is received within the spoiler for injecting high frequency pulses of pressurized gas into the airstream. The injector unit includes a resonance tube in outlet fluid communication with a nozzle. The pulsating output of the resonance tube perturbs the flow of pressurized gas in the nozzle, effectively breaking it up into discrete slugs or pulses which then exit the nozzle and enter the airstream. The high frequency perturbation of the airflow across the weapons bay, created by the aircraft weapons bay high frequency acoustic suppression apparatus, effectively suppresses undesirable acoustic resonance within the open weapons bay.

U.S. Pat. No. 5,340,054 discloses perturbation elements located at the leading edge of a cavity to eliminate oscillations found to occur in the cavities of a structural frame moving through a fluid. The perturbation elements reflect any remaining oscillations out of the cavity at the trailing edge and may take the form of multiple pins of various shape and geometrical arrangement which prevents the generation and growth of vortices causing acoustic oscillations. The reflection of remaining oscillations out of the cavity may be accomplished by ramping the trailing edge of the cavity.

U.S. Pat. No. 5,699,981 discloses an aircraft cavity acoustic resonance suppression system comprising a small diameter, cylindrically shaped member disposed parallel to and spaced up to a distance corresponding to about three airflow boundary layer thicknesses from the surface of the aircraft near the leading edge of the cavity and transverse of airflow thereacross, and an actuator operatively connected to the member providing selective adjustment of the spacing between the member and the aircraft surface.

U.S. Pat. No. 6,050,527 discloses a flow control device and method for eliminating flow-induced cavity resonance within a closed or nearly closed end flow passage having an inlet opening defined between an upstream inlet edge and a downstream inlet edge. The passage accepts exterior fluid flow therein via the opening. The flow control device includes a stationary inlet guide vane having a leading edge, a trailing edge, and a number of support members to connect the vane to the inlet.

EP 1 714 871 discloses an acoustic resonator for use in an engine including a cavity having a volume, an aperture, and a passage connecting the aperture and the cavity. The aperture has a profiled surface at a leading edge for delaying separation of fluid entering the passage and for reducing losses caused by fluid separation.

SUMMARY OF THE INVENTION

The above-mentioned drawbacks are addressed by the invention by means of a method and open type cavity having the features of the respective independent claims.

According to the invention, the rear face geometry of the cavity is modified so as to lie on a curved convex surface when viewed in cross-section along a longitudinal axis of the cavity.

In particular, an elliptic shape has been found to cause a steady shear layer reattachment and thereby restrict the mass flowing in and out of the cavity, leading to significant reduction or complete alleviation of the oscillations. Such an embodiment will be referred to as Elliptic Rear Face (ERF).

In an embodiment reduced to practice, the ellipse has a semi-major axis twice the cavity depth and a semi-minor axis that exactly spans the complete depth of the cavity. However, different aspect ratios have also been found to be effective including an aspect ratio of 1:1, which defines a circular surface.

Although an elliptic rear face has been found to be particularly effective, the invention is not limited to only an elliptic geometry. More generally, a cross-section through a longitudinal axis of the convex curved surface may describe part of an ellipse, hyperbola, parabola, general polynomial, general trigonometric function, general hyperbolic function or any general exponential function.

It is to be noted that the invention differs from the above-referenced paper by Zhang et al. discussed above and shown in FIG. 1b in two respects. First, in the invention the curved surface preferably extends from or close to the floor of the cavity. More specifically, good results are expected if the curved surface intersects the rear wall of the cavity at a height no greater than 0.2D, where D is the depth of the cavity. Even more preferably it extends from the floor of the cavity as shown in FIG. 4. As opposed to this, in Zhang et al. the distance h shown in FIG. 1 may vary between 0.2 to 0.6D, which means that the curved surface, which intersects the rear wall of the cavity at a height D-h, is displaced at least 0.4D from the floor of the cavity. Furthermore, at the point where the curved surface in Zhang et al. intersects the rear wall of the cavity, there is a discontinuity in the surface gradient, which is avoided altogether in the preferred geometry of the present invention. Secondly, as noted, in the present invention particularly advantageous results have been obtained using an elliptical wall surface. As noted above, the difference is highlighted by comparing FIG. 16 of Zhang et al. with FIG. 13d of the present invention, both showing computed pressure oscillations in the vicinity of the trailing edge of the cavity.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE INVENTION

Figure 1A:
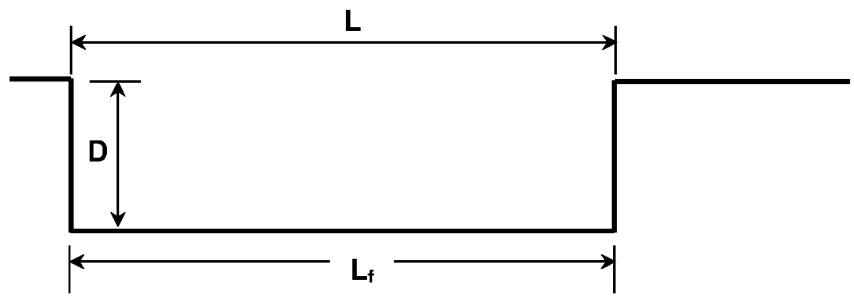
FIGS. 1a and 1b are schematic representations of prior art open cavities showing geometric configurations and nomenclature.
Figure 1B:
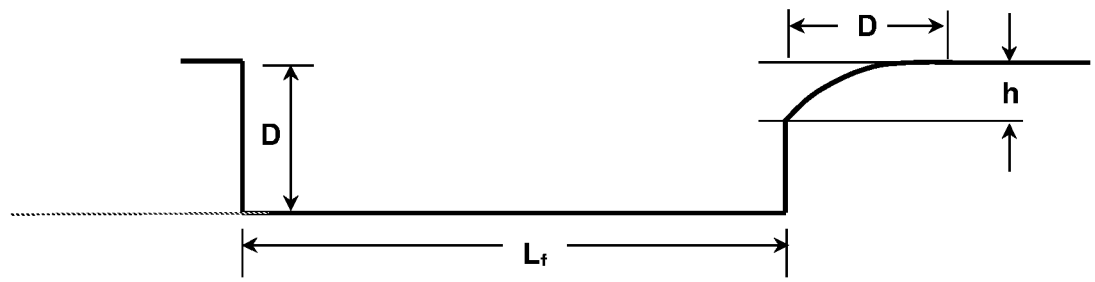
Figure 4:
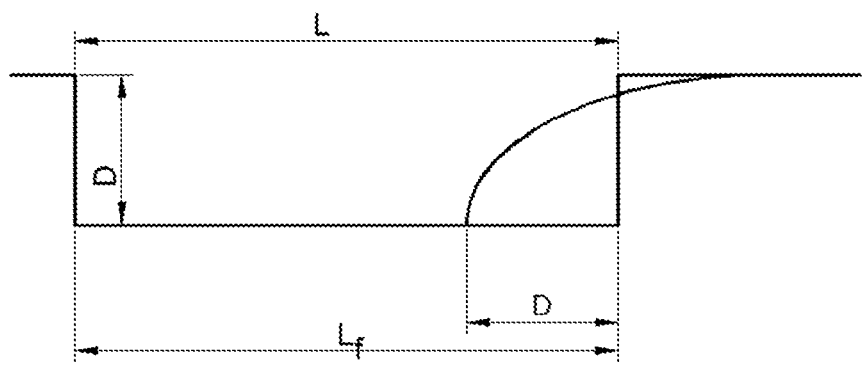
FIG. 4 is a schematic representation of a modified open cavity according to an embodiment of the invention.

FIG. 4 is a schematic representation of an open cavity having modified geometry according to an embodiment of the invention. For this particular Elliptic Rear Face (ERF) configuration the cavity length (L) is from the leading edge of cavity to the mid-plane of the elliptic wall (50% of the semi-major axis). It is seen that $L_f$ representing the floor length is equal to L-D and is different for the rectangular cavity ($L_f$=L) shown in FIG. 1 and shown here also for comparison.

Figure 5A:
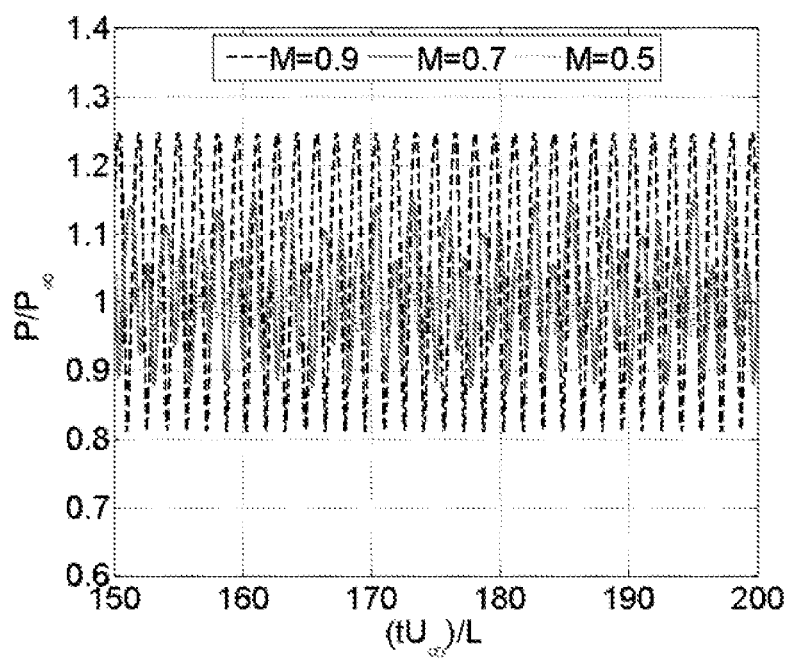
FIG. 5a shows graphically computed pressure time histories on the rear face at different Mach numbers.
Figure 5B:
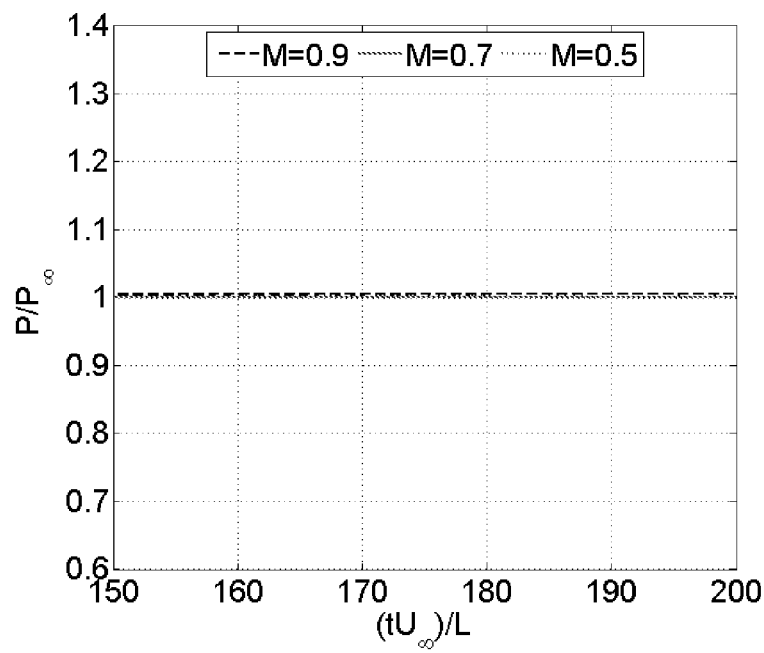
FIG. 5b shows graphically computed pressure time history demonstrating a complete alleviation of the oscillation shown in FIG. 5a by adopting ERF.

The solution according to the invention lies in the geometry itself and is achieved by altering the geometry at the flow impacting face and keeping the cavity size intact in terms of its length and depth. In the present invention, one of the proposed shapes is the elliptic shape of the forward facing step in the cavity to reduce the pressure oscillations and noise. In addition to the experiments that were carried out by the inventors to prove the inventive concept, two-dimensional CFD simulations were also made using commercially available software ANSYS-FLUENT. The results shown in FIGS. 5a and 5b demonstrate a complete alleviation of the oscillation. The pressure fluctuations (pressure normalized by the freestream pressure) with time (normalized by freestream velocity and the cavity length) are quite evident for the VRF configuration and are shown in FIG. 5a for different Mach numbers at a location on the rear wall. The adoption of an elliptical convex surface as the cavity rear face shows no fluctuations on the rear wall as presented in FIG. 5b, indicating the complete alleviation of oscillation at all Mach numbers.

Figure 6A:
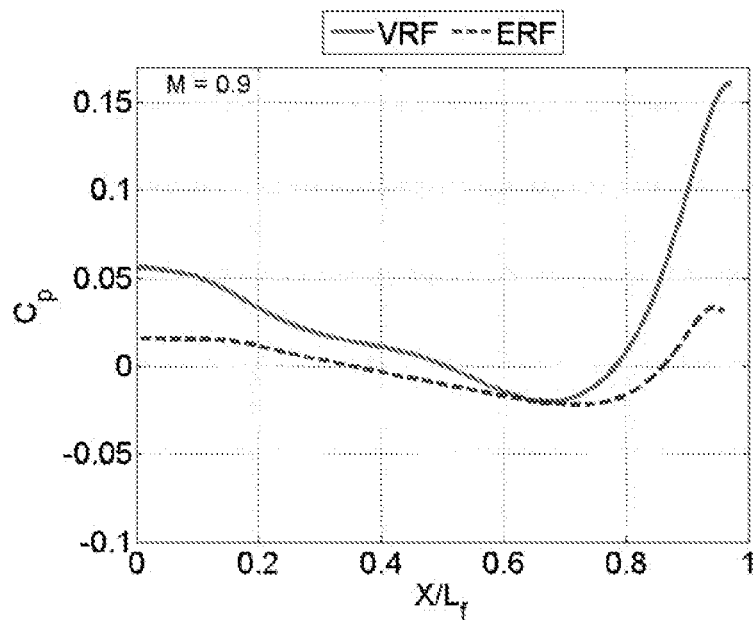
FIG. 6a shows graphically the computed difference in pressure coefficients along the cavity floor between a rectangular cavity and an elliptic edged cavity at M=0.9.
Figure 6B:
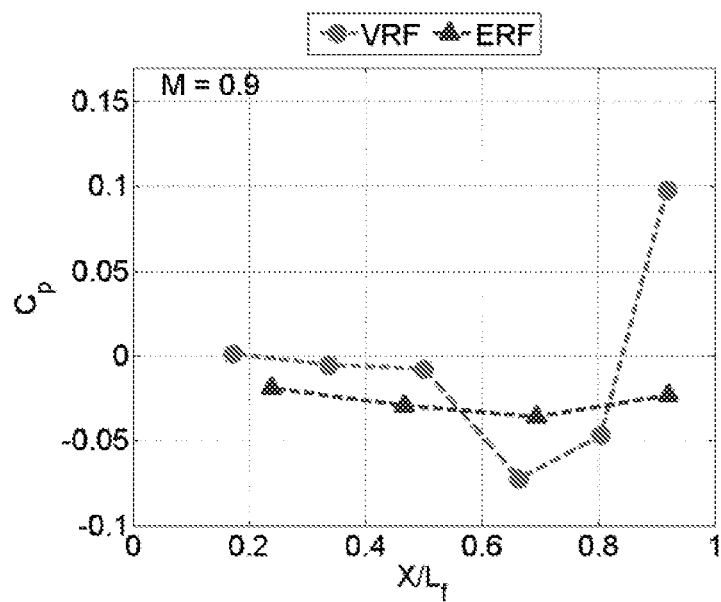
FIG. 6b shows graphically the actual difference in pressure coefficients as measured experimentally along the cavity floor between a rectangular cavity and an elliptic edged cavity at M=0.9.

The result of the present invention is to soften the impact on the forward facing edge by adopting an alteration to shape of the rear edge and the face of the cavity. FIG. 6 shows the difference in the pressure coefficients along the cavity floor (X normalized by $L_f$) between a regular rectangular cavity and an altered elliptic edged cavity at M=0.9. The significant pressure coefficient drop is observed on the bottom surface once the elliptic shape is used as seen from the figures. A uniform cavity floor pressure distribution is observed which indicates that it is less susceptible to adverse outputs.

Figure 7:
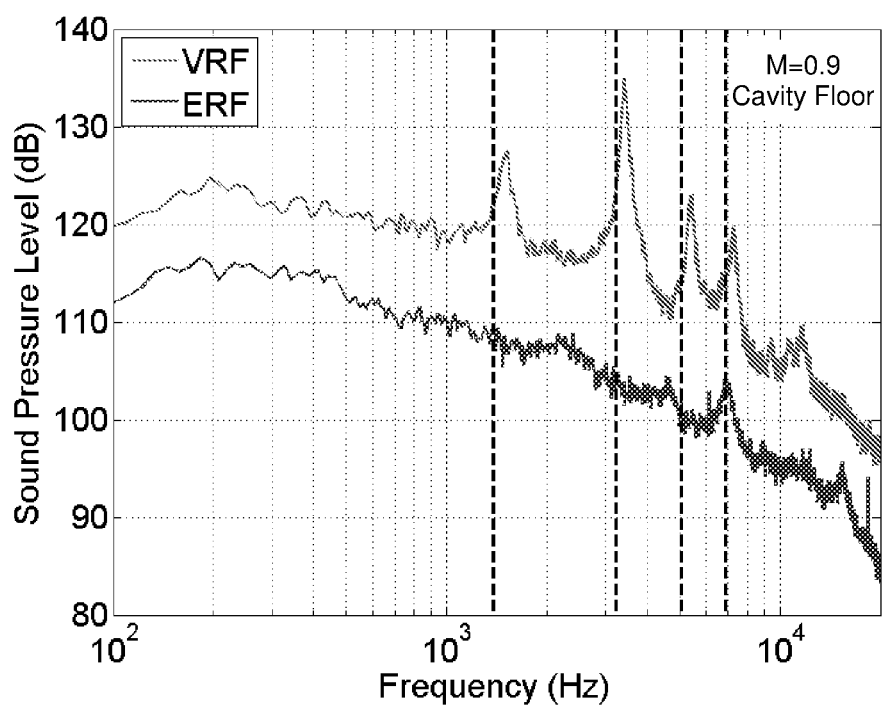
FIG. 7 is a comparison of measured sound pressure level on the cavity floor for a rectangular cavity and an elliptic edged cavity showing the complete removal of edge tones at M=0.9.

FIG. 7 compares measured sound pressure level on the cavity floor for an open rectangular cavity (VRF) and an altered elliptic edged cavity (ERF) at M=0.9. The dominant mode frequencies of the fluctuating pressures are shown for a regular rectangular cavity measured on the cavity floor at M=0.9. In contrast the sound pressure level measured for the elliptic face cavity at M=0.9, as shown in the same figure clearly indicates the alleviation of all the edge tones and its modes.

From the foregoing description, it thus emerges that the invention provides the following features:
1. Change in rear face/edge of the cavity from a vertical wall to a curved wall can considerably reduce the pressure oscillations over open type cavities and in particular an ellipse shape could completely reduce the oscillations, at subsonic, transonic and supersonic Mach numbers.
2. The invention can be applied to many cavity applications, in particular car window/roof opening (subsonic), airplane landing gears (subsonic), airplane weapon bay (transonic), scramjet isolator and cavity flame holder in scramjet combustor (supersonic) and more, having open type configuration, where the problem associated with pressure fluctuations are maximum.
3. The implementation of the invention leads to an almost uniform pressure distribution on the cavity floor which is helpful to the dropping of the load (e.g., weapon) in terms of safety and accuracy.
4. The invention can also be useful as a cavity flame holder design where flame stability and a proper mixing with recirculation zone is of prime interest in a combustion chamber. A combustion chamber requires a stable cavity for flame holding and a recirculation region inside the cavity with hot pool of radicals which reduce the induction time. The open type cavity according to the invention can meet both of these stringent requirements with a good degree of performance.

The above description is believed to be enabling and provides sufficient support for the appended claims Nevertheless for the sake of caution, the following Appendix includes portions of a draft journal article that sets out in detail the results of experiments and simulations on the basis of which the invention was conceived and reduced to practice. The graphical results to which the Appendix relates are referenced in the figures. It is noted that as of the date of filing this application, the draft journal article has not yet been published.

APPENDIX

In this study, we propose a geometric modification, the first of its kind, to the cavity rear face from vertical to an elliptic shape. It is demonstrated, experimentally and numerically, that for a regular open rectangular cavity and a range of subsonic and transonic Mach numbers between M=0.5 to 0.9, this technique immensely reduces and may even completely eliminates the self-excited strong cavity flow oscillations (Rossiter's modes). The experiments include shadowgraph and oil flow visualization, measurement of static and unsteady pressures. Computations involve two-dimensional unsteady compressible RANS solution with k-w SST turbulence model using ANSYS-Fluent.

1. Introduction

Cavity flow application spans the entire range of Mach numbers, starting from subsonic, transonic, supersonic to hypersonic flows. Specific examples include flows in landing gears of aircrafts, store separation from internal cavity, isolator flow control in scramjet intakes, cavity flame holder in combustion chambers, etc. Cavity flows are categorized as open or closed based on their length to depth (L/D) ratio. In open cavity flows with L/D ratio less than 10, strong pressure oscillations are created. These produce severe fluctuating pressures as well as noise levels in the vicinity of the cavity which could be detrimental to the structure housing the cavity and its integrity. Research has been carried out to understand these unsteady pressure characteristics (e.g., Alvarez et al. (2004)), and towards control of such loads by implementing various passive and active controlling techniques (e.g., Rowley & Williams (2006)).

Figure 2:
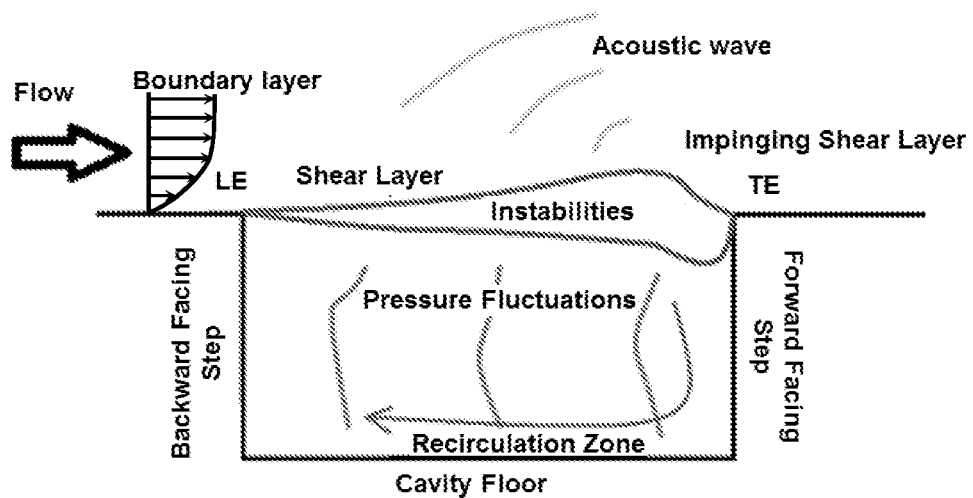
FIG. 2 shows further details of a prior art open cavity flow geometry.
Figure 3:
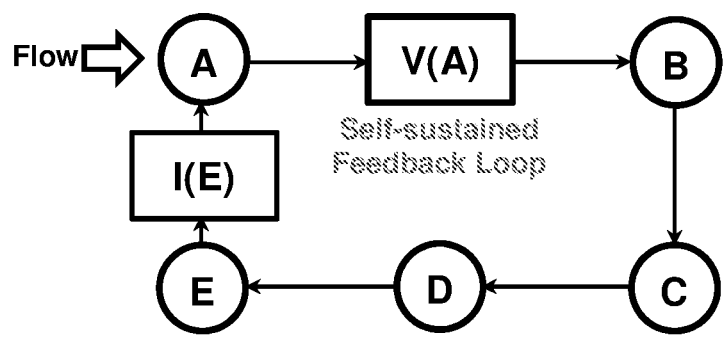
FIG. 3 shows schematically a self-sustained feedback loop associated with the prior art open cavity oscillations.

When the freestream flow separates from the leading edge (LE) of cavity, as shown in FIG. 2, a shear layer is formed, which bridges the entire cavity length. Upon impingement on the rear face of the cavity, in the vicinity of its trailing edge (TE), an acoustic field is formed that propagates upstream and excites the shear layer formation at the LE and induces a Kelvin-Helmholtz type of instability which grows during convection towards TE to form an array of vortices. After impact on the rear face, acoustic waves are regenerated which closes a feedback loop and provides self-sustained pressure oscillations. These oscillations and its associated resonance frequencies can be determined by phase relation across the feedback loop that provides constructive reinforcement of the waves. The spectrum of the pressure fluctuations inside the cavity is composed of broadband noise and narrow-band tones. The source of broadband is due to the free-stream and the shear layer.

The resonance frequencies (tones) were first provided by Rossiter (Rossiter 1964) who developed a semi-empirical formula and later modified as:

$$n = \frac{(m-\alpha)}{\left[\left(\frac{U_\infty}{U_c}\right) + \left(\frac{M_\infty}{\sqrt{1+0.2M_\infty^2}}\right)\right]}$$

where n is the non-dimensional frequency (Strouhal number), $U_\infty$ and $M_\infty$ are the freestream velocity and Mach number, respectively, m the integer mode number, $\alpha$ is an empirical constant associated with phase delay between vortex shedding and acoustic wave response in the cavity and Uc is the convection velocity of vortices over the cavity length.

Passive and active flow control techniques have been attempted to destroy the feedback loop. Some examples include the use of vortex generators, sawtooth spoilers (Moon et al. 2010), stepped leading edge (MacManus & Doran 2008), geometric ramp trailing edge (Vikramaditya & Kurian 2009), leading edge serrations (Gai et al. 2015), passive resonant absorbers (Roberts et al. 2015), etc. There are mixed results from these passive devices, as for example the LE serration and sawtooth spoiler reports no significant improvements, whereas all other devices reports tonal attenuation of maximum 20 dB and reduce broadband level in terms of overall sound pressure level (OASPL) to 7 dB and these reductions are also a function of Mach and Reynolds number.

Active techniques tried so far include upstream mass injection (Arunajatesan et al. 2009), steady blowing (George et al. 2015), microjet actuators (Ali et al. 2010), plasma actuators (Yugulis et al. 2014), oscillating ramp, fence (Sarno & Franke 1994), mass injection (Vakili & Gauthier 1994), etc. Reduction in root mean square (RMS) pressure of around 40-50% is reported with mass injection and 7-10 dB reduction in peak tones, 5 dB reduction in OASPL for different other active controls. The adoption of plasma actuator reports the maximum peak tone reduction of 23 dB at M=0.6. However, with all these active and passive control techniques, there is no report of a complete alleviation of tonal peaks and vanishing of the mode frequencies.

Water tunnel experiments with three different trailing edge geometries (Sharp, Nose shape and Round) of cavity are reported (Pereira & Sousa 1994). No significant change in oscillation amplitude with rounding of the trailing edge is reported. Numerical simulation of supersonic flow oscillations over cavity with modifications in trailing edge geometry (45° wedge, localized curved ramps with different curvature) has been attempted by (Zhang 1998). The wedge response (up to 12 dB reduction) was better than the curved edge in terms of reduction in fluctuating pressures. Reviews of cavity flow field studies and its control are reported in (Lawson & Barakos 2011) and (Cattafesta et al. 2008).

It is worthwhile to look for a more simplistic approach to alleviate such unwanted and inevitable loads arising due to geometry configuration. In the present investigation, it is proposed to have an elliptic shape of the rear face of the cavity in order to reduce the pressure oscillations and noise. The experimental and numerical results strongly support this proposition.

2. Experiments

All the experiments were performed using the Transonic Wind Tunnel facility of Faculty of Aerospace Engineering, Technion, Israel. It is an induced type closed circuit tunnel with a test section size of 800 mm (height), 600 mm (width) and 1500 mm (length). The operating Mach number of the tunnel is from 0.1 to 1.1. Present tests were performed at Mach numbers of 0.5, 0.7 and 0.9 corresponding to a unit Reynolds of Re=10.7, 13.5 and $15.7 \times 10^6$/m, respectively.

The cavity model used in the present study is a sting mounted type, and is designed in a modular form such as to change different parts of the cavity. The cavity dimensions are length, L=61 mm, depth, D=17 mm and width, W=34.6 mm, giving L/D=3.58. The forebody of the cavity has 134 mm length and a width of 69.4 mm. The sidewalls of the cavity are made of fused silica windows to have an optical access inside the cavity depth for flow visualization and optical measurements.

The regular rectangular cavity has a vertical rear face (VRF). In the present investigation cavity rear face geometry was changed to an elliptic shape (ERF) with semi major axis twice the cavity depth. The geometric configuration followed is shown schematically in FIG. 4. For the ERF configuration the cavity length (L) is from the leading edge of cavity to the mid-plane of the elliptic wall (50% of the semi-major axis). In the figure Lf represents the floor length which is different for rectangular (Lf=L) and elliptic (Lf=L−D) cavity.

Boundary layer measurements were required in order to provide accurate incoming velocity distribution to our 2D CFD simulations. In-house built staggered pitot boundary layer probes were used to measure the boundary layer over the model at the location of leading edge of the cavity. The boundary layer thickness at M=0.7 was estimated to be 6 mm and follows ⅐th power law profile.

Oil flow visualization tests were carried out to obtain the surface flow field details using a proper mixture of Titanium Dioxide, Oleic acid, and lubricating oil. Mixture was sprayed evenly to all the surfaces of the cavity prior to each test run. Still images on all the surfaces were obtained after the test run and allowing the streak lines to dry. Standard Schlieren system with two 12", f/7.6 parabolic mirrors have been used to obtain shadowgraph images of the cavity overall flow field. A 50 Hz pulsed Xenon light source (3 mm arc length) with energy of 1 J and pulse width of 9 μs has been used to obtain the instantaneous flow images. The light source was synchronized with a 1 MP CMOS Camera (Phantom V211) with a capability of 2 kHz frame rate and controlled through PCC 2.4 software supplied by Vision Research.

Static and total pressures were measured using Honeywell sensors of suitable ranges. Pressure ports of 1.2 mm diameter were made on the cavity floor (6 Nos.) and the cavity rear face (5 Nos.) for all the cavity configurations. The ports were connected to sensors through steel and polythene tubing in the tunnel. Sensor outputs were amplified and filtered using signal conditioner from National Instruments SCXI 1520/1125. Static pressures were sampled, averaged and recorded using a 16 bit NI PXI 6221 Data Card. Unsteady pressures were measured using Endevco 8510B-5 and 8530C-15 sensors, having natural frequency of 85 kHz and 180 kHz, respectively. Locations of unsteady pressure measurements on the cavity were at the mid-centerline of the front face and floor for VRF, and ERF. Additional test was performed for VRF by placing the front cavity block to the rear block site to get fluctuating pressures on the rear face. The two unsteady pressure sensors were sampled separately using a 24 bit data card NI USB 4431, and 16 bit NI PXI 6221. The unsteady data were sampled at 50 kHz for 2 seconds. The signal was high-pass filtered at 100 Hz and low-filtered at 20 kHz. For the analysis the data were broken into record lengths of $2^{12}$ samples split into 48 blocks with a 50% overlap giving a frequency resolution of 12.2 Hz. The blocks were windowed using Hanning function and FFT spectral data was produced using Welchs method in MATLAB.

Uncertainty analysis was carried out using test runs and specific repeatability tests. The uncertainty on working Mach number is estimated to be ±0.01. The variation in repeated pressure measurements in terms of Cp (Coefficient of pressure $Cp=((p-p_\infty)/0.5 \rho_\infty U_\infty^2)$, is estimated to be ±0.007. Repeatability of unsteady pressures indicates variation in dominant frequency within 25 Hz, Sound Pressure Level peaks of the order of 1 dB and broadband energy OASPL within ±0.5 dB.

3. Simulations:

Unsteady 2D CFD simulations of the compressible Reynolds Averaged Navier Stokes equations were carried out using the commercial finite volume code, FLUENT Ansys. For turbulence closures, the k-ω SST model was used. Only after the convergence to a steady state, 2nd order implicit transient simulations were initiated. The physical time step Δt was set corresponding to a sample rate of 100 kHz, sufficient to capture accurately the Rossiter modes.

The entire computational domain was distributed with uniform quadrilateral cells having near wall cell spacing of the order of 0.09 mm corresponding to $y^+$ of 13 on the cavity floor. A UDF Program was plugged into the inlet boundary condition to simulate turbulent boundary layer with 1/n-th power law similar to the experimental observation. Pressure far field boundary condition was applied to all the outer boundaries, and the no slip and no penetration wall boundary conditions were applied to cavity walls.

For the post processing and data analysis, specific points were monitored on the cavity surfaces to get the time history of fluctuating pressures. FFT of the pressure signals was done using MATLAB. To obtain the time statistics of other flow properties on the complete cavity geometry, data sampling with a sampling time of 2 msec was performed for all the computations after completion of the unsteady computation, so as to sufficiently take into account 10 cycles of oscillation. The mean and RMS details were obtained only after these operations.

4. Results and Discussion:

4.1. Qualitative Flow

Figure 8:
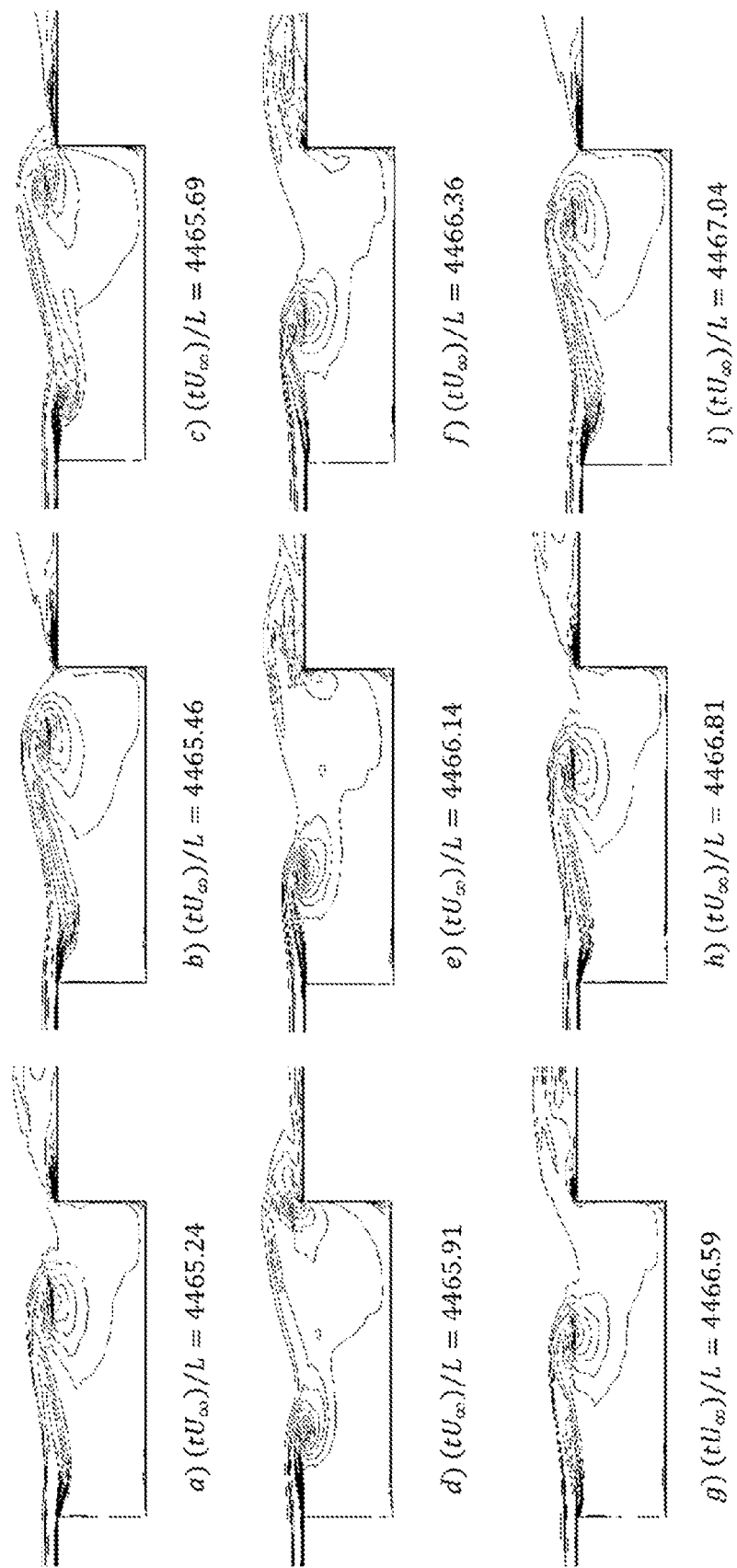
FIG. 8 shows vorticity contours at different non-dimensional time.

The vorticity contours obtained from the 2D computations over the rectangular cavity (VRF) at M=0.9 and at different non-dimensional time is presented in FIG. 8. Unit non-dimensional time is the time taken by the freestream flow to pass the cavity length. FIG. 8 presents the different phases of this vortex shedding with a time gap of 48.9 μs ($\tau=tU_\infty/L=0.22$). The figure shows the formation of vortices at the LE of cavity and their downstream convection towards the TE of cavity. FIG. 8b shows a fresh evolution of vortex near the LE and through FIGS. 8c to 8i, the convecting vortex can be clearly seen. The complete cycle of formation of a vortex till the reformation of another vortex at the same location can be observed in FIGS. 8b to 8i.

A typical vortex takes a time of 0.35 ms ($\tau=1.57$) to travel the cavity length and hence the convection velocity of the vortex is approximately 174.3 m/s. The ratio of convection velocity to freestream velocity is $(U_c/U_\infty)=0.63$, compared to reported value of 0.57 by Rossiter (1964). Based on this estimated ratio, and with modified Rossiter equation, a comparison is made for the Strouhal number vs Mach number for the cases studied in the present investigation for rectangular cavity.

Figure 9:
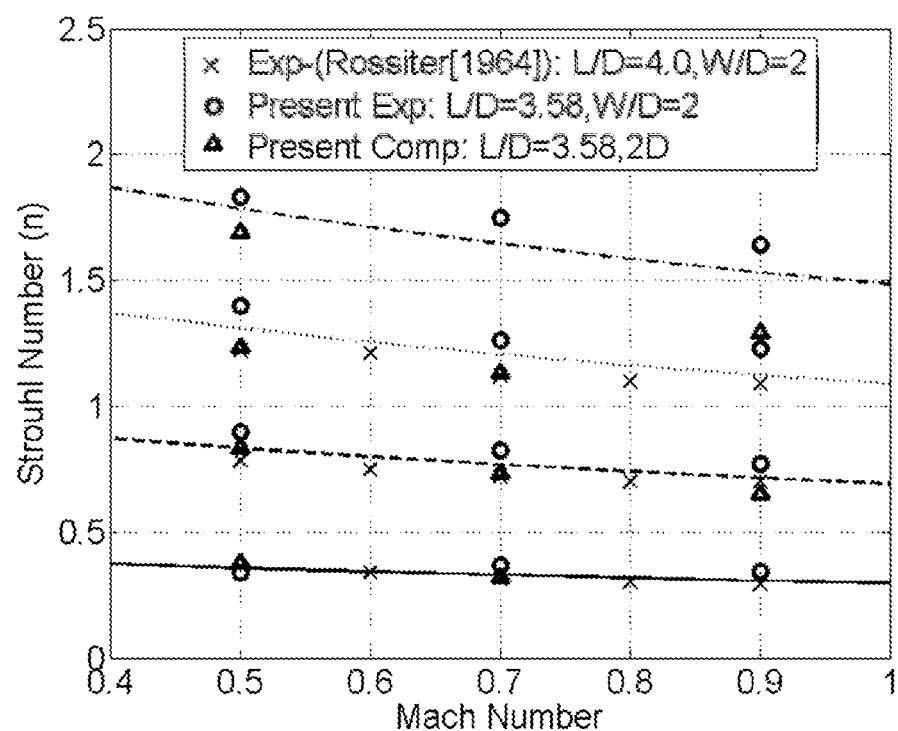
FIG. 9 shows a comparison of experimental and computed results for a rectangular cavity.

FIG. 9 shows the results obtained through experiments and as well computations. There is a very good agreement between our 2D computations and Rossiter's empirical relation (indicated by various lines) and experiments. Our experimental results are also well predicted except for the 4th mode.

Figure 10:
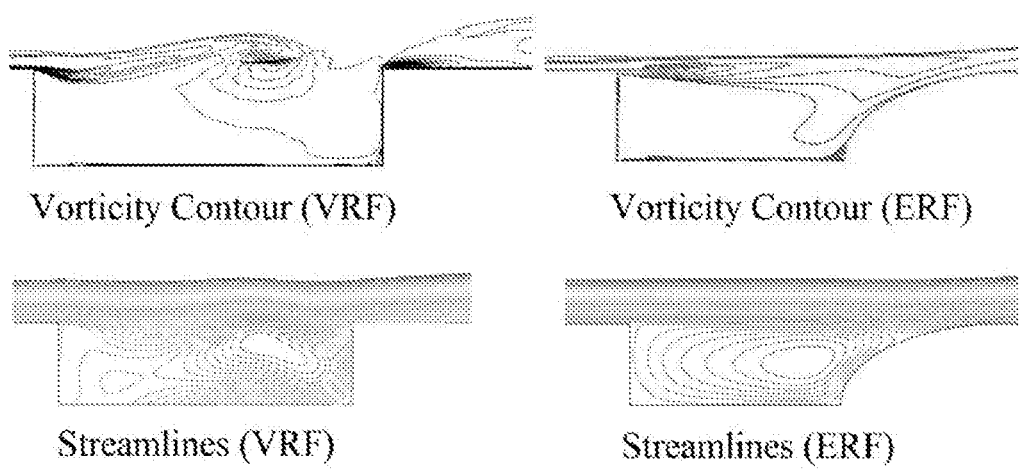
FIG. 10 shows a comparison of computed instantaneous flow field.

In the present investigation, the vertical rear face of the cavity is being altered to an elliptic shape. Results of instantaneous 2D computations, associated with the two configurations, are compared in FIG. 10. The vorticity magnitude contour (top row) indicates an alleviation of the shedding of vortices from the cavity leading edge, leading to a smooth shear layer impact on the rear edge of the cavity. The streamlines (bottom row) also show a uniform circulatory flow for Elliptic Rear Face cavity (ERF) compared to a non-uniform oscillatory flow for Vertical Rear Face geometry(VRF). More importantly, the contours presented for the ERF configuration do not vary with time, indicating a 2-D steady state solution.

Figure 11A:
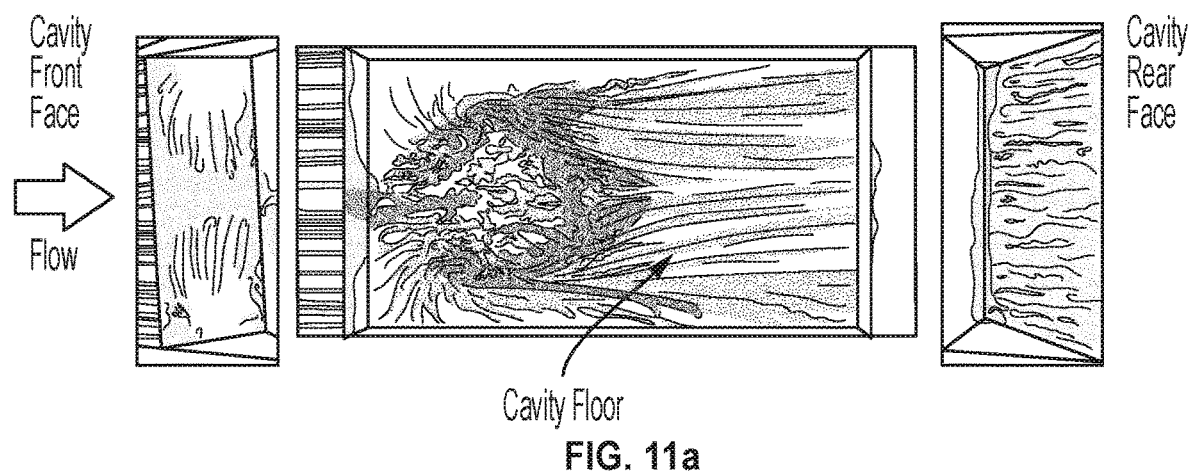
FIG. 11a shows surface flow patterns on the faces of a rectangular cavity at M=0.9 adopting oil flow visualization.

This indicates a smooth shear layer impingement on the cavity trailing edge. Surface flow patterns on all of the cavity faces of VRF, adopting oil flow visualization is presented in FIG. 11a, with some perspective errors. The freestream flow impinges on the rear face and tries to curl down inside the cavity which in turn gets separated very near to the floor line, represented by the accumulating oil line. The attached flow pattern on the cavity floor indicates a flow in an opposite direction to the freestream flow till 60% of the cavity length from the rear face of the cavity. There is a flow separation beyond this point and is represented by a discontinuation of the oil flow streak lines. The two lobes appearing on both sides of the centerline of the cavity are due to the influence of the sidewalls. There is also a flow from the front face till the edge of these lobes in the direction of the freestream, on the floor, indicating flow lift off from the cavity floor.

Figure 11B:
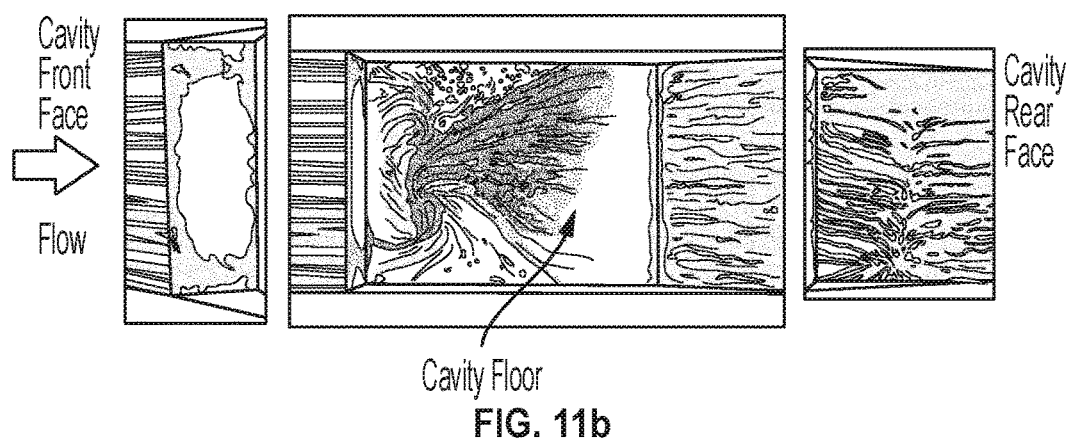
FIG. 11b shows surface flow patterns on the faces of an elliptic edged cavity at M=0.9 adopting oil flow visualization.

The flow pattern on the front face and the cavity side face (not shown) corroborate the off-centric two lobes and the flow lift-off appearing on the cavity floor, respectively. The oil flow pattern on the rear face of ERF (FIG. 11b) indicates two directions, one along the freestream and the other towards the cavity depth. The cavity floor surface flow indicates a difference in flow field compared to VRF. The flow separation has reduced along the length of the cavity floor. There is also a flow pattern difference on the front face for ERF in comparison to VRF.

4.2. Mean Wall Pressures

Figure 12A:
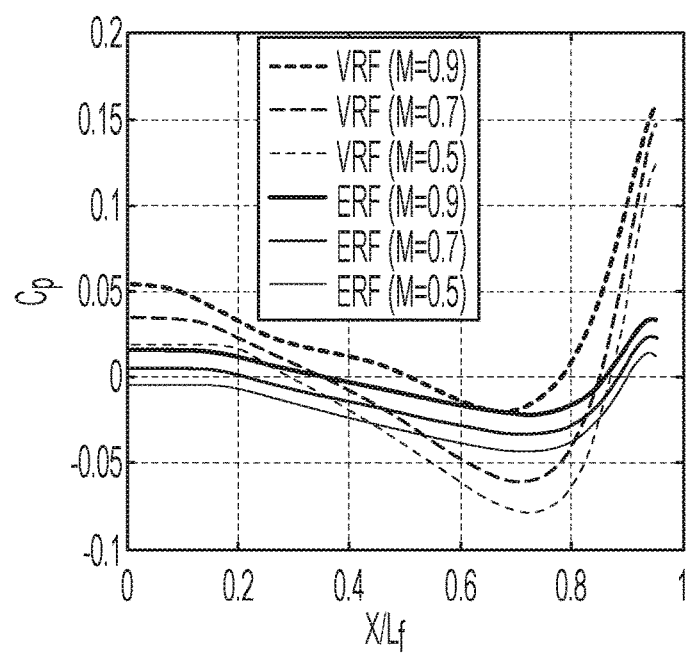
FIGS. 12a and 12b show comparisons of computed and measured pressure distributions on the cavity floor at various Mach numbers.
Figure 12B:
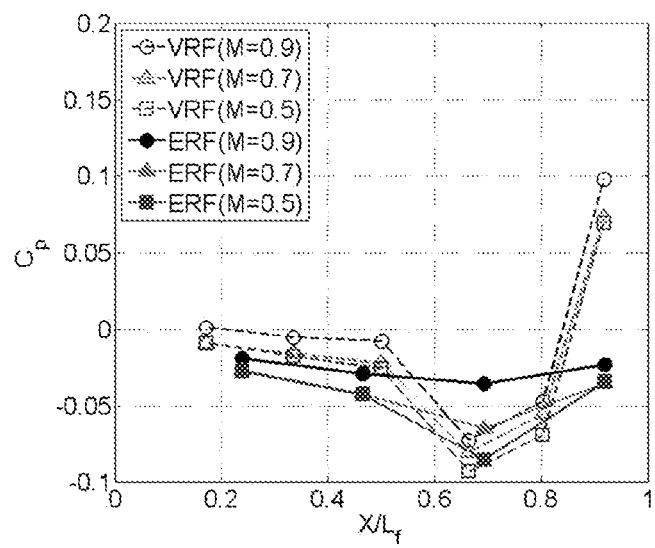

The pressure distributions along the cavity floor in 2D computation and at limited locations on cavity floor centerline in experiments for Mach numbers of 0.5, 0.7 and 0.9 with cavity having VRF and ERF are presented in FIGS. 12a and 12b. Floor pressure for cavity with VRF near to the rear face location i.e., X/Lf=0.9-1.0, indicates a very high value due to the flow impact. As the flow turns towards the LE of the cavity, the pressure drops on the floor, indicating a flow acceleration, till $X/Lf=0.7$. Beyond this point the flow slows down and an adverse pressure gradient is being built up, which leads to flow separation at $X/Lf \leq 0.4$. The pressure trend is similar for all the Mach numbers; however, the values are different. Comparison between computed pressures (FIG. 12a) and measured pressures (FIG. 12b) also shows the similarity for cavity with VRF.

Adoption of elliptic rear face (ERF) abruptly brings down the peak pressure, existing near the rear face location at $X/Lf \approx 0.9$. The flow then becomes almost uniform on the remaining cavity length till the front face of the cavity. Trend is similar for all the Mach numbers. The experimental observation (FIG. 12b) also indicates the similar trends with adoption of ERF in comparison to the computed results (FIG. 12a). This indicates an advantage in adopting the elliptic rear face which makes the cavity floor pressure uniform suitable for deployment of any store housed in the cavity without adversely affecting it with a pressure from the cavity floor.

4.3. Unsteady Pressure Results

Figure 13A:
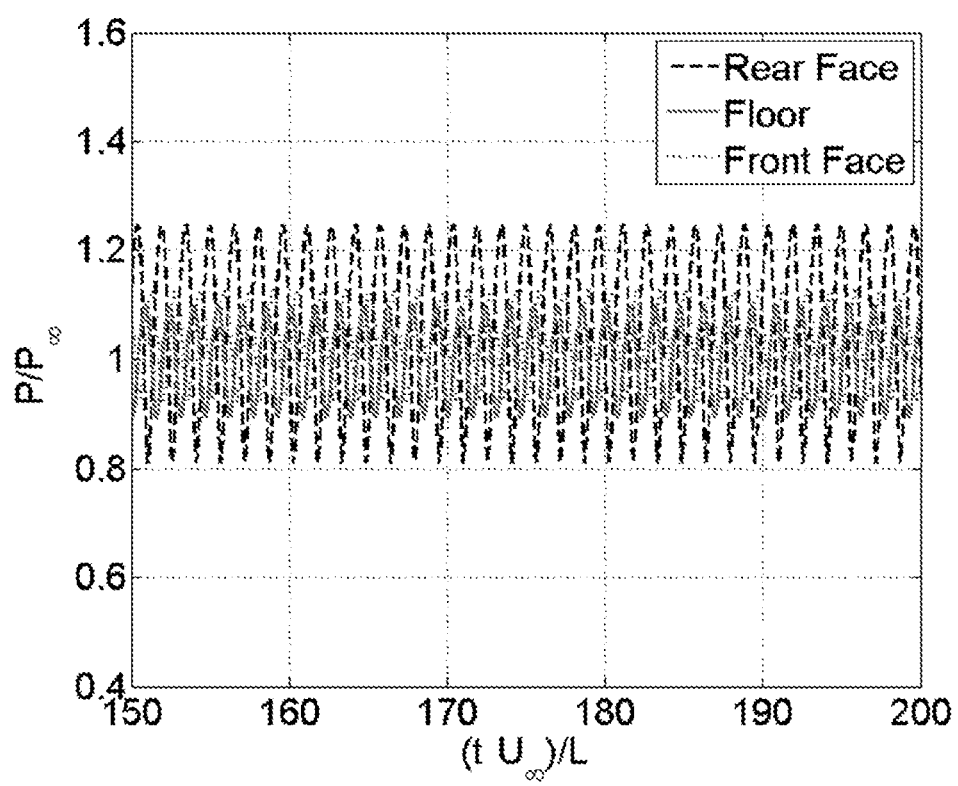
FIGS. 13a to 13d show computed pressure time histories for (a) VRF, M=0.9 (b) VRF, M=0.7 (c) VRF, M=0.5 (d) ERF, Rear Face, respectively.
Figure 13B:
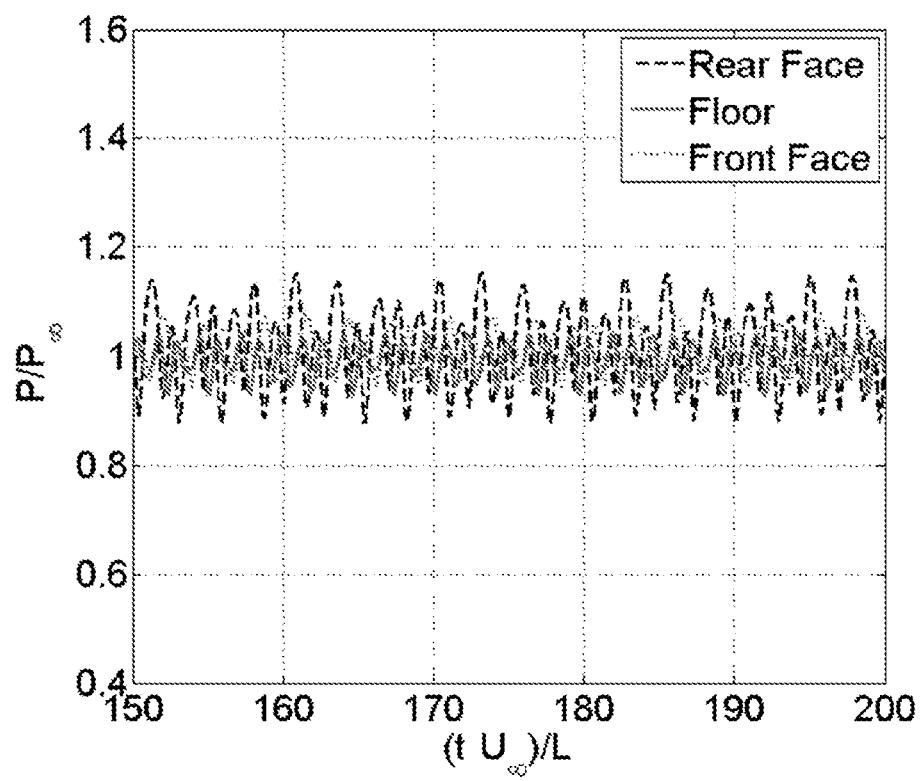
Figure 13C:
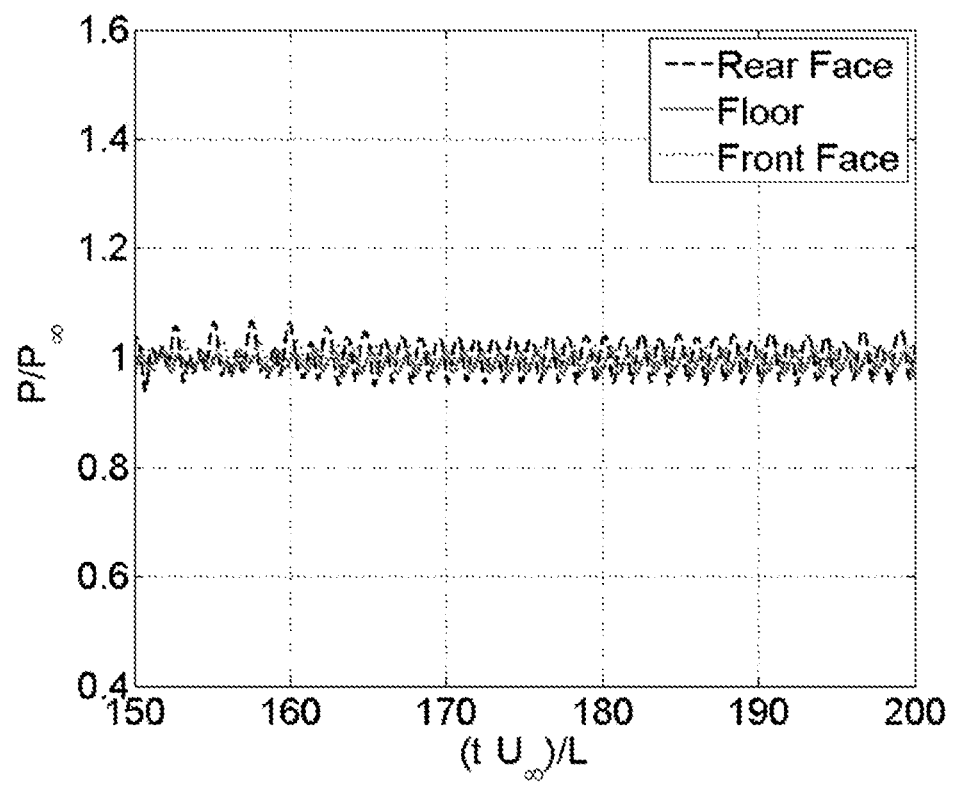

Solutions were obtained till 1.0 second for cavity with VRF which corresponds to $10^5$ samples with equidistant time steps for FFT analysis. Three points were monitored on the cavity to get the unsteady pressure time history and as well to compare with the experiments. The points were identified similar to experiments which were at the midpoint of rear face, floor and front face. The pressure time history obtained for cavity with VRF on all these points and at different Mach numbers for a small flow time window is presented in FIG. 13a-c. At $M=0.9$ (FIG. 13a), the pressure fluctuation is appearing to be maximum on the rear face compared to mid points on the floor and front face which are almost the same in terms of magnitude.

Figure 13D:
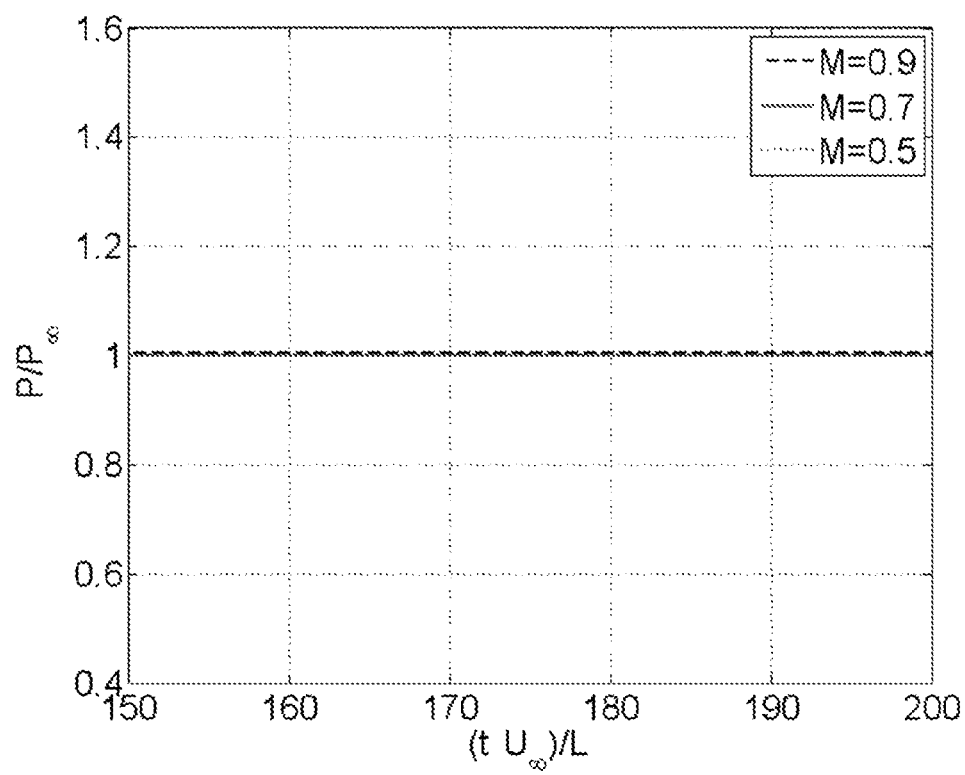

The respective frequencies of occurrence of these fluctuations also appear to be similar for all the three points with probably very small variations. With decrease in Mach number to $M=0.7$ (FIG. 13b) and $M=0.5$ (FIG. 13c), the amplitude of pressure fluctuation decreases on all the points and as well the pattern of fluctuation also differs. The pressure time history computed on midpoint of rear face of cavity with adoption of elliptic rear face (ERF) for all the Mach numbers tested is presented in FIG. 13d. The figure shows no pressure fluctuation on the rear face which is likely to be exhibiting the highest pressure fluctuating point in a cavity. The result is independent of the Mach number. This clearly indicates a tremendous advantage in altering the rear face of the cavity geometry by an elliptic shape.

Figure 14A:
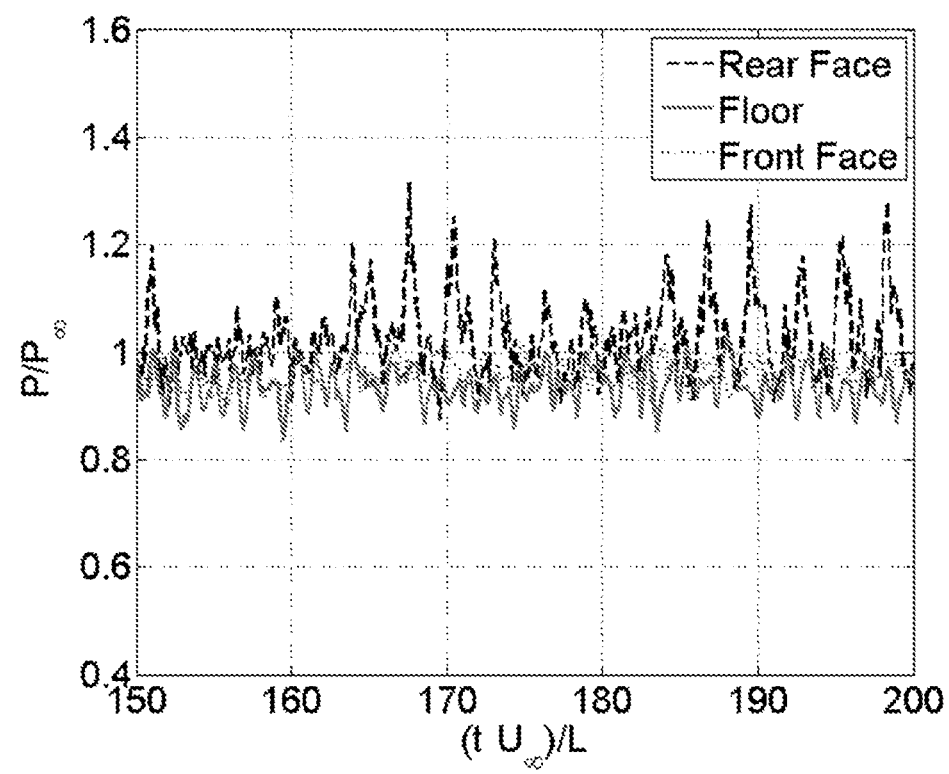
FIGS. 14a to 14d show measured pressure time histories for (a) VRF, M=0.9 (b) VRF, M=0.7 (c) VRF, M=0.5 (d) ERF, Floor, respectively.
Figure 14B:
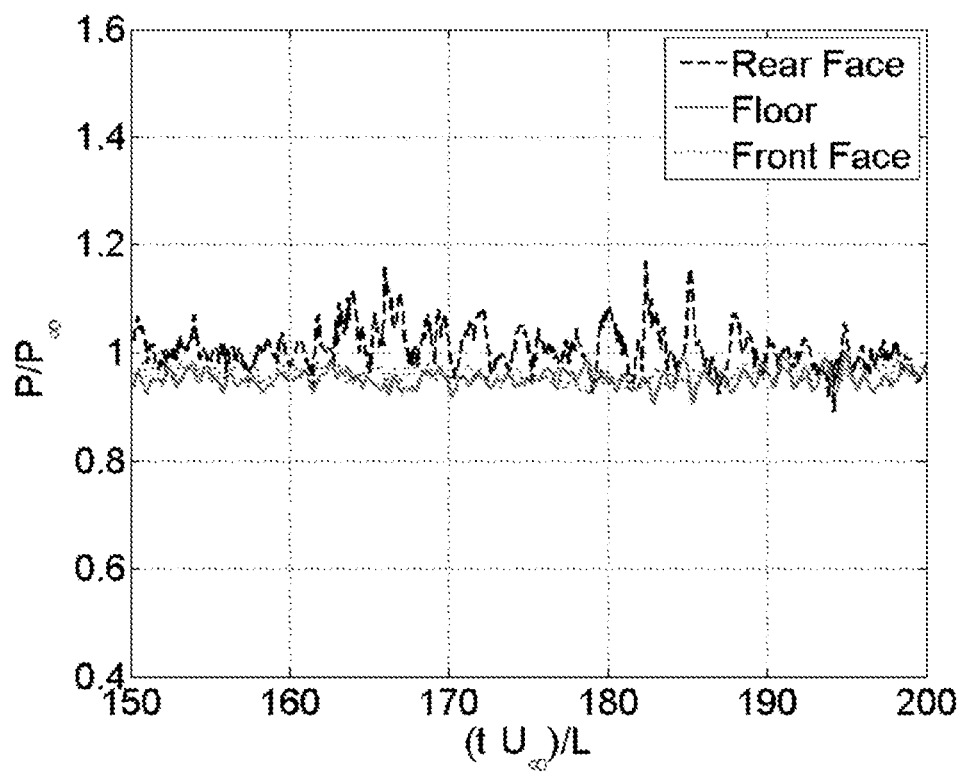
Figure 14C:
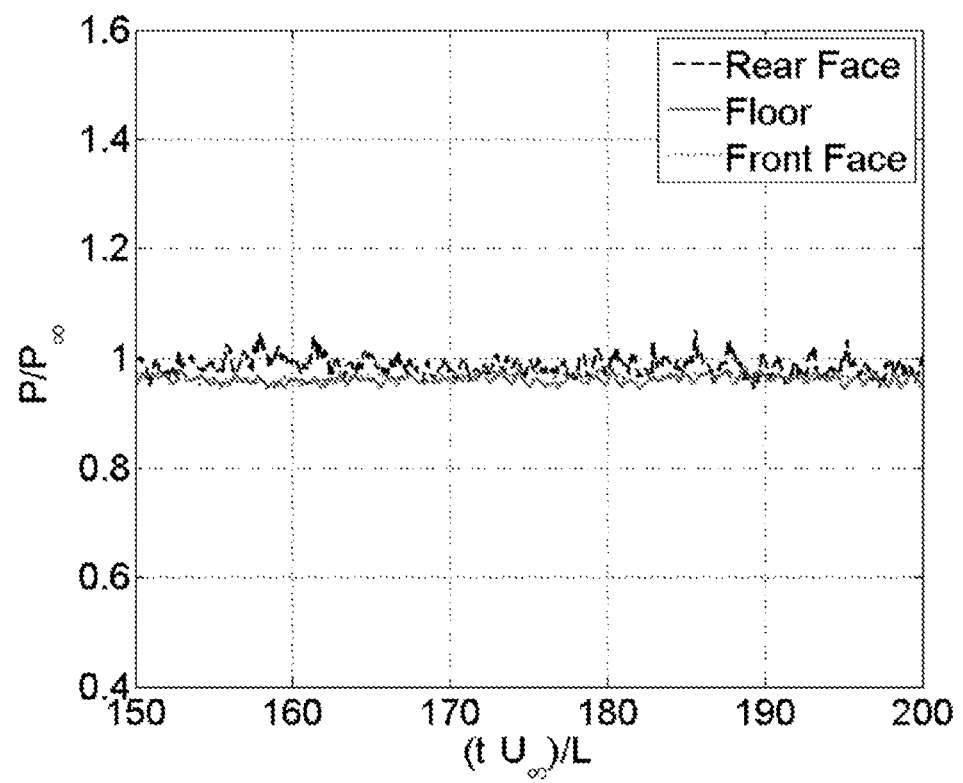
Figure 14D:
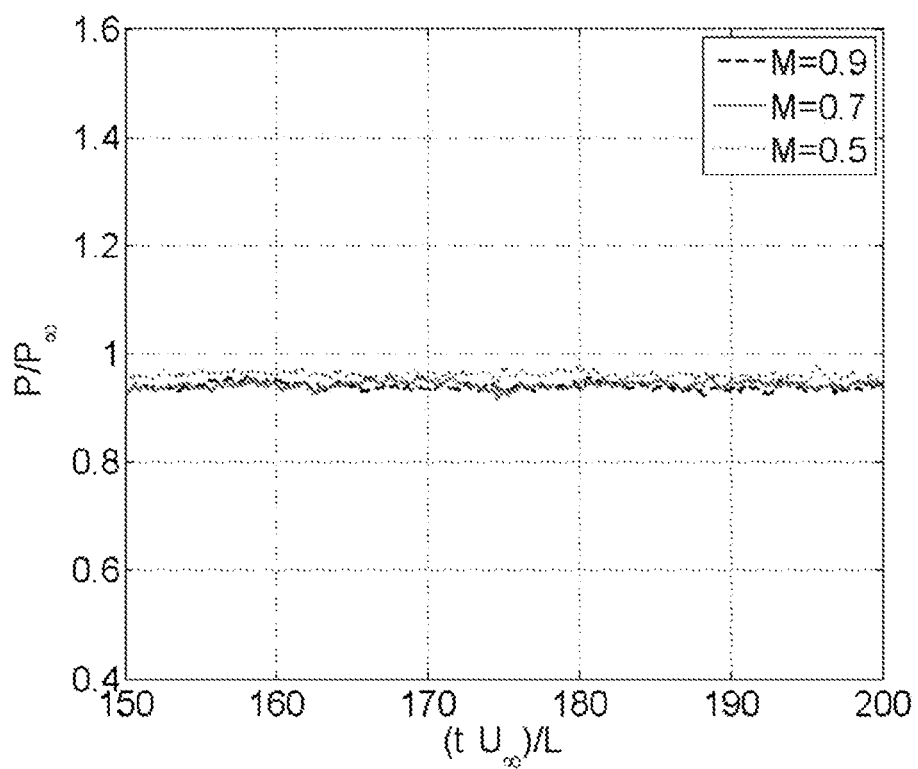

Experiments were performed to obtain the time resolved pressures at limited locations on the mid-centerline of cavity front face, floor and rear face for VRF. The pressure time history for all the sensors for a specific time window and at different Mach numbers are presented in FIGS. 14a-c. The pressure fluctuations are clearly demonstrated and which diminishes with decrease in Mach number. Clearly the rear face sensor records the highest-pressure oscillations. Cavity floor records the pressure fluctuation lower than rear face and higher than front face. Experiments with cavity having ERF have only two locations of pressure measurement: one at the cavity floor and other at the front face. The pressure time history on the cavity floor at various Mach numbers is shown in FIG. 14d. At all Mach numbers the demonstration of alleviation in the pressure fluctuation is quite evident from the figure, in full agreement with the 2D computed results.

Figure 15:
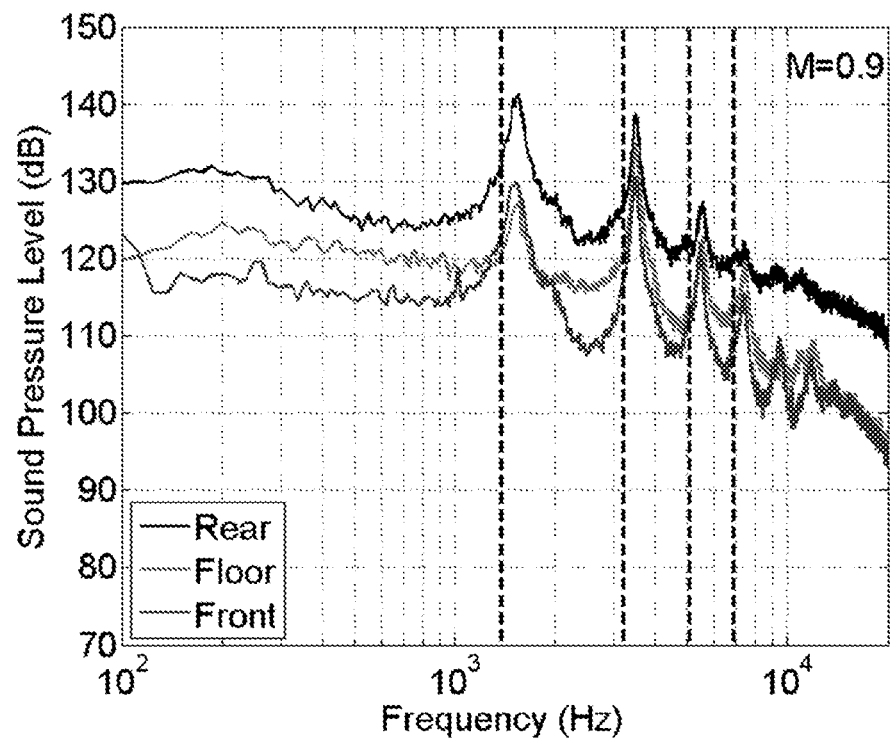
FIG. 15 shows sound pressure level (SPL) obtained from experiments for VRF at M=0.9.

Sound pressure levels obtained from these pressure data for cavity with VRF at $M=0.9$ is presented in FIG. 15. In the same figure four highlighted dashed vertical lines represents the Rossiter's frequencies obtained from the semi-empirical relation. The measured frequencies and the predicted ones are quite similar in comparison. All the faces of cavity show similar frequencies of oscillation but with a reduced peak tone values from rear face to floor to frontal face. There is also a reduction in broadband as well as narrow band tones as we move from rear face to the front face. This indicates that the phenomenon of the oscillation is occurring on the entire cavity length but the influence is from the rear face or the edge of the cavity and travelling upstream towards the leading edge of cavity. Hence modification of the geometry of rear face could induce smaller influences to the rest of the cavity length.

Figure 16A:
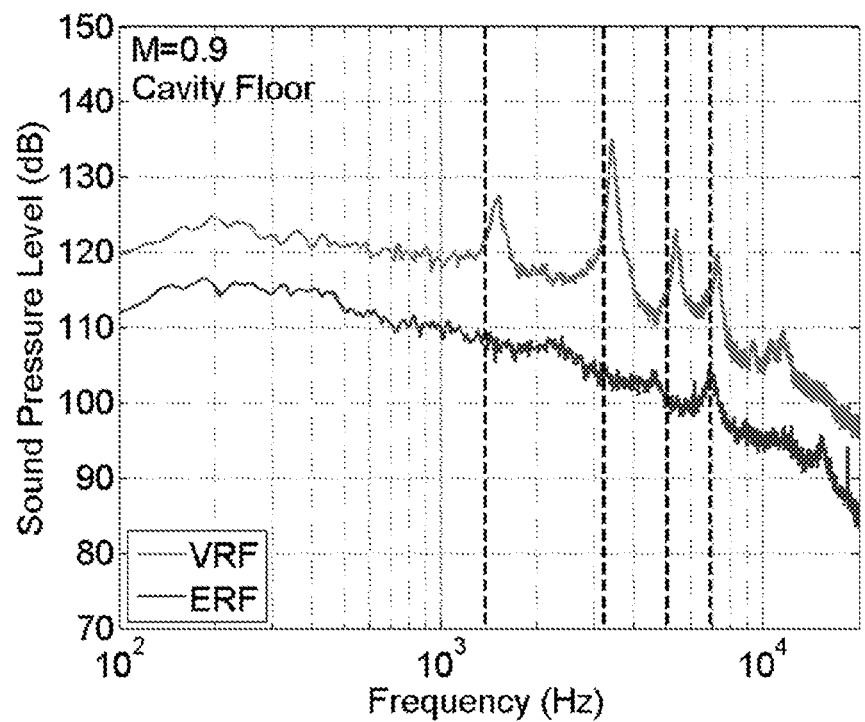
FIGS. 16a to 16c show comparison of measured SPL on the cavity floor for (a) M=0.9 (b) M=0.7 (c) M=0.5, respectively.
Figure 16B:
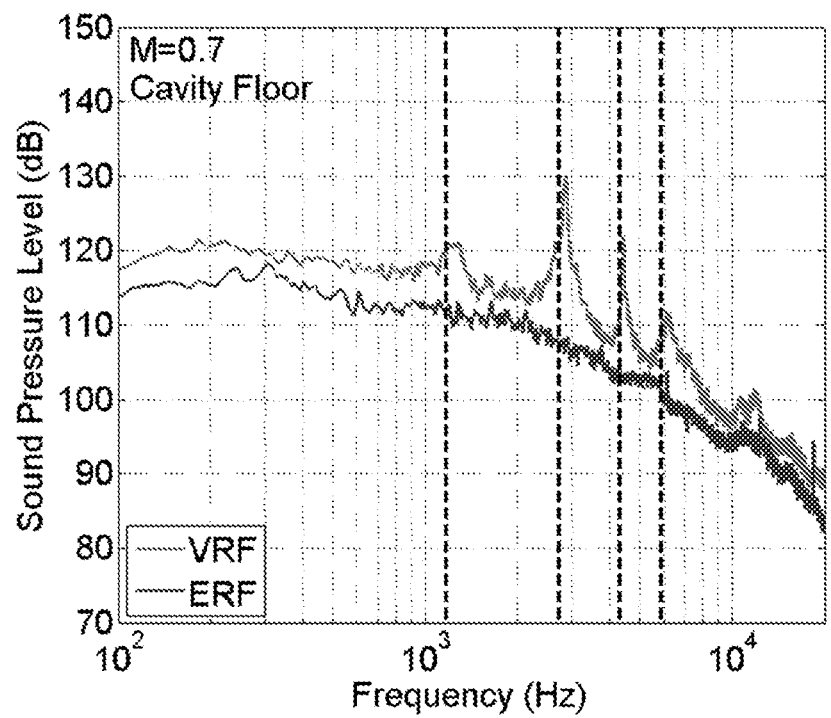
Figure 16C:
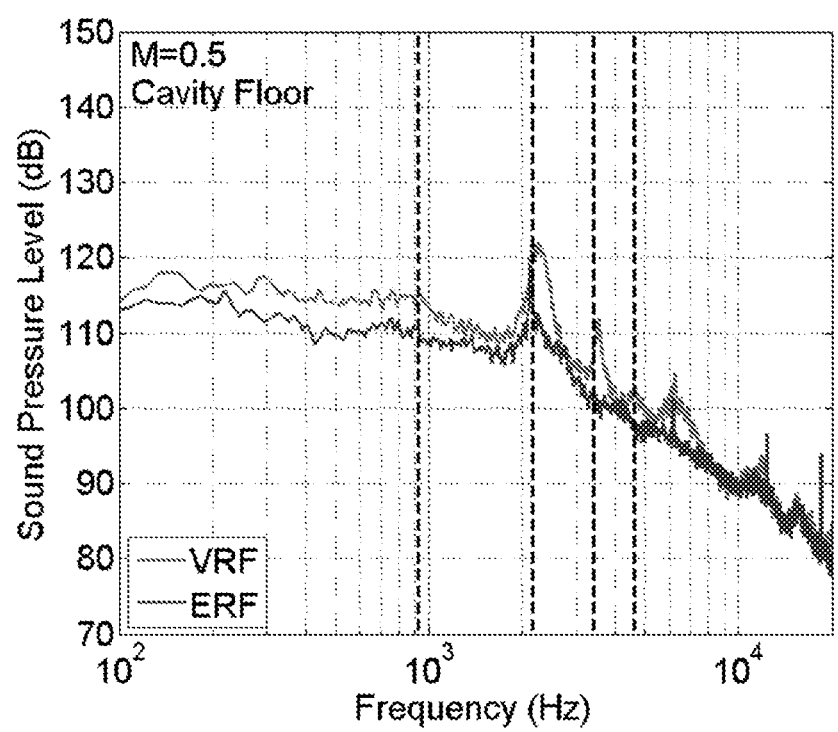

Comparison of measured sound pressure levels on the cavity floor for cavity with VRF and ERF for various Mach numbers are presented in FIGS. 16a to 16c. At $M=0.9$, a clear demonstration of complete alleviation of tonal peaks (dominant peak reduction of 30 dB) and reduction in the average broadband spectra of around 10 dB is observed (FIG. 16a). The response of ERF at $M=0.7$ (FIG. 16b) also indicates the removal of tonal peaks (dominant peak reduction of 23 dB) and reduction in broadband spectra by 5 dB. However, as the Mach number drops to $M=0.5$ (FIG. 16c), the specific mode frequencies are observed to be subdued, but the second mode is seen to be present with some reduction (10 dB) in the amplitude. The broadband spectrum is also observed to be similar for higher frequencies, which are attributed to the noise of the tunnel itself. Schlieren photographs have been used to demonstrate that the presence of acoustic waves in the far flow field in the VRF case is completely eliminated when the rear of the cavity is replaced by ERF.

5. Concluding Remarks:

Experiments and computations were made over a regular rectangular cavity at subsonic and transonic speeds. Geometric modification to the rear edge/face of the cavity was performed by utilizing an elliptic shape. The underlying flow features around rectangular cavity was obtained and it was also confirmed through comparing it with the approximate predictions using Rossiter's semi-empirical relation. The large amplitude discrete cavity tones were observed, which are due to the cavity flow feedback loop, shear layer formation and more importantly the flow impact on the rear edge of the cavity. Adoption of a different rear edge or modification of the vertical rear cavity shape to an ellipse has proved immensely in completely alleviating the cavity narrow band tones at all frequencies and reducing the broad band spectra. The static pressures also remain uniform in the entire length of the cavity floor. This technique is believed to be the simplest and robust method to date in efficiently removing the tonal mode frequencies over open cavities.

REFERENCES

Prior art references considered to be relevant as a background to the invention are listed below. Acknowledgement of the references herein is not to be inferred as meaning that these are in any way relevant to the patentability of the invention disclosed herein.

[1] Ali, M. Y., Solomon, J. T., Gustaysson, J., Kumar, R. & Alvi, F. S. 2010 *Control of resonant flow inside a supersonic cavity using high bandwidth pulsed micro-actuators*. AIAA 2010-1198.

[2] Alvarez, J. O., Kerschen, E. J. & Tumin, A. 2004 *A theoretical model for cavity acoustic resonances in subsonic flow*. AIAA 2004-2845.

[3] Arunajatesan, S., Kannepalli, C., Sinha, N., Sheehan, M., Alvi, F., Shumway, G. & Ukeiley, L. 2009 *Suppression of cavity loads using leading-edge blowing*. AIAA Journal 47, 5, 1132-1144.

[4] Cattafesta, L. N., Song, Q., Williams, D. R., Rowly, C. W. & Alvi, F. S. 2008 *Active control of flow-induced cavity oscillations*. Progress in Aerospace Sciences 44, 7-8, 479-502.

[5] Gai, S. L., Kleine, H. & Neely, A. J. 2015 *Supersonic flow over a shallow open rectangular cavity*. Journal of Aircraft 52, 2, 609-616.

[6] George, B., Ukeiley, L., Cattafesta, L. N. & Kunihiko, T. 2015 *Control of three-dimensional cavity flow using leading-edge slot blowing*. AIAA-2015-1059.

[7] Lawson, S. J. & Barakos, G. N. 2011 *Review of numerical simulations for high-speed, turbulent cavity flows*. Progress in Aerospace Sciences 47, 186216.

[8] MacManus, D. G. & Doran, D. S. 2008 *Passive control of transonic cavity flow*. Journal of Fluids Engineering 130, 064501(1-4).

[9] Moon, S. J., Gai, S. L., Kleine, H. H. & Neely, A. J. 2010 *Supersonicflow over straight shallow cavities including leading and trailing edge modifications*. AIAA 2010-4687.

[10] Pereira, J. C. F. & Sousa, J. M. M. 1994 *Influence of impingement edge geometry on cavity flow oscillations*. AIAA Journal 32, 8, 1737-1740.

[11] Roberts, D. A., MacManus, D. G., Johnson, R. A., Grove, J. E., Birch, T. J. & Chaplin, R. A. 2015 *Passive attenuation of modal cavity aeroacoustics under supersonic and transonic conditions*. AIAA Journal 53, 7, 1861-1877.

[12] Rossiter, J. E. 1964 *Wind tunnel experiments on the flow over rectangular cavities at subsonic and transonic speeds*. Tech. Rep. 3438. Aeronautical Research Council Reports and Memoranda.

[13] Rowley, C. W. & Williams, D. R. 2006 *Dynamics and control of high-Reynolds-number flow over open cavities*. Ann. Rev. Fluid Mech. 38, 251-276.

[14] Sarno, R. L. & Franke, M. E. 1994 *Suppression of flow-induced pressure oscillations in cavities*. Journal of Aircraft 31, 1, 90-96.

[15] Vakili, A, D. & Gauthier, C. 1994 *Control of cavity flow by upstream mass-injection*. Journal of Aircraft 31, 1, 169-174.

[16] Vikramaditya, N. S & Kurian, J. 2009 *Effect of aft wall slope on cavity pressure oscillations in supersonic flows*. The Aeronautical Journal 113, 1143, 291-300.

[17] Yugulis, K., Hansford, S., Gregory, J. W. & Samimy, M. 2014 *Control of high subsonic cavity flow using plasma actuators*. AIAA Journal 52, 7, 1542-1554.

[18] Zhang, X., Rona A. Edwards J. A. 1998 *The effect of trailing edge geometry on cavity flow oscillation driven by a supersonic shear layer*. The Aeronautical Journal Paper No. 2258, 129-136.

The invention claimed is:

1. A method for reducing pressure oscillations or acoustic loads over an open type rectangular cavity having a front face, an upper edge of which constitutes a leading edge, and having a rear face, an upper edge of which constitutes a trailing edge, said pressure oscillations or acoustic loads being formed by shear layer vortices passing from the leading edge to the trailing edge, said shear layer vortices impinging on a corner of the trailing edge and generating acoustic waves that travel in an opposite direction causing resonance and pressure fluctuations, said method including applying curvature to all the rear face of the cavity so as to present a convex curved surface internal to the cavity and thereby reduce the acoustic waves and resonance.

2. The method according to claim 1, wherein a cross-section through a longitudinal axis of the convex curved surface describes part of an ellipse.

3. The method according to claim 1, wherein a cross-section through a longitudinal axis of the convex curved surface describes part of a hyperbola.

4. The method according to claim 1, wherein a cross-section through a longitudinal axis of the convex curved surface describes part of a parabola.

5. The method according to claim 1, wherein a cross-section through a longitudinal axis of the convex curved surface describes part of any one of a general polynomial, general trigonometric function, general hyperbolic function and general exponential function.

6. The method according to claim 1, when used to reduce oscillations, at subsonic, transonic and supersonic Mach numbers.

7. The method according to claim 1, wherein the open type rectangular cavity is in the group consisting of: car windows, roof opening, subsonic airplane landing gears, transonic airplane weapon bay, supersonic scramjet isolator and cavity flame holder in scramjet combustor.

8. A method for reducing pressure oscillations or acoustic loads over an open type rectangular cavity having a front face an upper edge of which constitutes a leading edge and having a rear face an upper edge of which constitutes a trailing edge, said method including applying curvature to at least an upper part of the rear face so as to present a convex curved surface internal to the cavity such that a cross-section through a longitudinal axis of the convex curved surface describes part of an ellipse.

9. An open type cavity comprising:
a planar front face extending perpendicular to a floor of the cavity, an upper edge of which front face constitutes a leading edge; and
a rear face, an upper edge of which constitutes a trailing edge,
wherein the rear face is curved so as to present a convex curved surface internal to the cavity extending from or adjacent to a floor of the cavity thereby reducing acoustic waves which would otherwise be formed by shear layer vortices passing from the leading edge to the trailing edge and impinging on a corner of the trailing edge.

10. The open type cavity according to claim 9, wherein a cross-section through a longitudinal axis of the convex curved surface part of an ellipse.

11. The open type cavity according to claim 9, wherein a cross-section through a longitudinal axis of the convex curved surface part of a hyperbola.

12. The open type cavity according to claim 9, wherein a cross-section through a longitudinal axis of the convex curved surface part of a parabola.

13. The open type cavity according to claim 9, wherein a cross-section through a longitudinal axis of the convex curved surface describes part of any one of a general polynomial, general trigonometric function, general hyperbolic function and general exponential function.

14. The open type cavity according to claim 9, being in the group consisting of: car windows, roof opening, subsonic airplane landing gears, transonic airplane weapon bay, supersonic scramjet isolator and cavity flame holder in scramjet combustor.

15. An open type cavity comprising:
a planar front face extending perpendicular to a floor of the cavity an upper edge of which front face constitutes a leading edge, and
a rear face an upper edge of which constitutes a trailing edge;
wherein at least an upper portion of the rear face is curved so as to present a convex curved surface internal to the cavity such that a cross-section through a longitudinal axis of the convex curved surface describes part of an ellipse thereby eliminating acoustic waves which would otherwise be formed by shear layer vortices passing from the leading edge to the trailing edge and impinging on a corner of the trailing edge.

* * * * *

UNITED STATES PATENT AND TRADEMARK OFFICE
CERTIFICATE OF CORRECTION

| | |
|---|---|
| PATENT NO. | : 10,823,207 B2 |
| APPLICATION NO. | : 16/074963 |
| DATED | : November 3, 2020 |
| INVENTOR(S) | : Jacob Cohen and Sudip Das |

It is certified that error appears in the above-identified patent and that said Letters Patent is hereby corrected as shown below:

In the Specification

In Column 6, Line(s) 43, delete "k-w" and insert --k-ω--, therefor.

In Column 12, Line(s) 64-67, delete "Ali, M. Y., Solomon, J. T., Gustaysson, J., Kumar, R. & Alvi, F. S. 2010 Control of resonant flow inside a supersonic cavity using high bandwidth pulsed micro-actuators. AIAA 2010-1198." and insert --Ali, M. Y., Solomon, J. T., Gustavsson, J., Kumar, R. & Alvi, F. S. 2010 Control of resonant flow inside a supersonic cavity using high bandwidth pulsed micro-actuators. AIAA 2010-1198.--.

Signed and Sealed this
Twelfth Day of January, 2021

Andrei Iancu
*Director of the United States Patent and Trademark Office*